(12) United States Patent
Northrop et al.

(10) Patent No.: US 8,171,885 B1
(45) Date of Patent: May 8, 2012

(54) CONTINUOUS FLOW PET WATERING DEVICE

(75) Inventors: Melaney Northrop, Mansfield, TX (US); Peter M. Schneider, Keller, TX (US); Adam W. Weber, Keller, TX (US)

(73) Assignee: Doskocil Manufacturing Company, Inc., Arlington, TX (US)

( * ) Notice: Subject to any disclaimer, the term of this patent is extended or adjusted under 35 U.S.C. 154(b) by 208 days.

(21) Appl. No.: 12/426,620

(22) Filed: Apr. 20, 2009

Related U.S. Application Data

(63) Continuation-in-part of application No. 12/360,412, filed on Jan. 27, 2009, now Pat. No. 7,958,844.

(51) Int. Cl.
*A01K 7/00* (2006.01)

(52) U.S. Cl. .......................................... 119/74

(58) Field of Classification Search .................. 119/51.5, 119/57.92, 61.5, 72, 74, 702; 472/117; 239/17–18, 239/21, 24; 40/406–407; 4/496
See application file for complete search history.

(56) References Cited

U.S. PATENT DOCUMENTS

| | | | |
|---|---|---|---|
| 3,112,733 A | 12/1963 | Arnott | |
| 3,720,184 A | 3/1973 | Pearce | |
| 3,901,439 A | 8/1975 | Willis | |
| 4,248,177 A | 2/1981 | Peterson et al. | |
| 4,584,966 A | 4/1986 | Moore | |
| 4,721,063 A | 1/1988 | Atchley | |
| 4,747,538 A | 5/1988 | Dunn et al. | |
| 4,819,874 A | 4/1989 | Geiger | |
| 4,836,142 A | 6/1989 | Duback | |
| 4,836,144 A | 6/1989 | Cole | |
| 4,924,812 A | 5/1990 | Bernays, Jr. | |
| 4,976,220 A | 12/1990 | Gershman | |
| D315,037 S | 2/1991 | Clark | |
| 5,138,980 A | 8/1992 | Ewing | |
| D330,098 S | 10/1992 | VanSkiver | |
| 5,167,368 A | 12/1992 | Nash | |
| 5,259,336 A | 11/1993 | Clark | |
| 5,326,032 A | 7/1994 | Quillin | |
| D350,841 S | 9/1994 | VanSkiver | |
| D350,842 S | 9/1994 | VanSkiver | |
| D351,689 S | 10/1994 | VanSkiver | |
| 5,407,393 A * | 4/1995 | Schmidt | 472/117 |
| 5,467,735 A | 11/1995 | Chrisco | |
| D364,942 S | 12/1995 | VanSkiver et al. | |
| D367,735 S | 3/1996 | VanSkiver et al. | |
| 5,501,178 A | 3/1996 | Kemp | |
| D374,109 S | 9/1996 | Lillelund et al. | |
| 5,743,210 A | 4/1998 | Lampe | |
| 5,799,609 A | 9/1998 | Burns et al. | |
| 5,842,437 A | 12/1998 | Burns | |
| 5,842,442 A | 12/1998 | Marr | |
| 5,845,600 A | 12/1998 | Mendes | |

(Continued)

*Primary Examiner* — Kimberly Berona
*Assistant Examiner* — Ebony Evans
(74) *Attorney, Agent, or Firm* — Eckert Seamans Cherin & Mellott, LLC; Brij K. Agarwal

(57) ABSTRACT

A pet watering device includes a bowl having a base with an upwardly extending sidewall attached to the base. A ramp is disposed within the bowl and extends from the bowl sidewall to the base. The ramp includes an aperture for dispensing water. A pump is disposed within the bowl. A water reservoir is disposed between the pump and the ramp aperture for storing water removed by the pump from the bowl. Water stored in the reservoir overflows the reservoir onto the ramp through the ramp aperture for return of water to the bowl.

29 Claims, 7 Drawing Sheets

U.S. PATENT DOCUMENTS

| | | |
|---|---|---|
| D405,560 S | 2/1999 | Chrisco |
| D406,924 S | 3/1999 | Kolozsvari |
| D406,926 S | 3/1999 | Kolozsvari |
| 6,044,797 A | 4/2000 | Leason et al. |
| 6,055,932 A | 5/2000 | Weber |
| 6,055,934 A | 5/2000 | Burns et al. |
| 6,079,361 A | 6/2000 | Bowell et al. |
| 6,079,951 A | 6/2000 | Morton |
| D428,217 S | 7/2000 | Rodack et al. |
| 6,101,974 A | 8/2000 | Frohlich |
| D432,279 S | 10/2000 | Kim |
| 6,142,099 A | 11/2000 | Lange, Jr. |
| 6,212,804 B1 * | 4/2001 | Richard .................. 40/406 |
| D446,889 S | 8/2001 | Bornhofen |
| D456,569 S | 4/2002 | Northrop |
| 6,378,460 B1 | 4/2002 | Skurdalsvold et al. |
| D457,275 S | 5/2002 | Skurdalsvold et al. |
| D457,692 S | 5/2002 | Skurdalsvold et al. |
| 6,460,483 B1 | 10/2002 | Northrop et al. |
| 6,467,428 B1 | 10/2002 | Andrisin et al. |
| 6,477,981 B1 | 11/2002 | Harper |
| D472,350 S | 3/2003 | Northrop et al. |
| 6,526,916 B1 | 3/2003 | Perlsweig |
| 6,527,257 B1 | 3/2003 | Schuld |
| 6,582,315 B1 * | 6/2003 | Formanski ................ 472/117 |
| 6,622,657 B2 | 9/2003 | Northrop et al. |
| 6,640,747 B2 | 11/2003 | Reusche |
| 6,789,503 B1 | 9/2004 | Gao |
| D497,041 S | 10/2004 | Plante |
| 6,928,954 B2 | 8/2005 | Krishnamurthy |
| D514,751 S | 2/2006 | Plante |
| 7,040,249 B1 | 5/2006 | Mushen |
| 7,089,881 B2 | 8/2006 | Plante |
| 7,264,176 B2 | 9/2007 | Johnson |
| 7,270,082 B2 | 9/2007 | Plante |
| D552,802 S | 10/2007 | Kuster |
| 7,281,494 B1 | 10/2007 | Connerley |
| D563,605 S | 3/2008 | Morris et al. |
| 7,341,203 B1 | 3/2008 | Yeomans et al. |
| 2002/0189548 A1 | 12/2002 | Northrop et al. |
| 2004/0118356 A1 | 6/2004 | Krishnamurthy |
| 2004/0262417 A1 * | 12/2004 | Proch ..................... 239/20 |
| 2005/0166853 A1 | 8/2005 | Plante |
| 2006/0011528 A1 | 1/2006 | Ireland |
| 2006/0174838 A1 | 8/2006 | Plante |
| 2006/0288947 A1 | 12/2006 | Perlsweig et al. |
| 2007/0095297 A1 | 5/2007 | Boyd |
| 2008/0078330 A1 | 4/2008 | McCallum et al. |
| 2011/0259273 A1 * | 10/2011 | Lipscomb et al. ........ 119/74 |

* cited by examiner

CONTINUOUS FLOW PET WATERING DEVICE

RELATED APPLICATION

This application is a continuation-in-part of U.S. patent application Ser. No. 12/360,412 filed Jan. 27, 2009 and entitled "Continuous Flow Pet Watering Device".

TECHNICAL FIELD OF THE INVENTION

The present invention relates to pet watering devices, and more particularly to a continuous flow watering device for pets whereby water is circulated to provide continuous running water for pets.

BACKGROUND OF THE INVENTION

Pet watering devices create flowing water to attract pets as well as to provide recirculation of the water to maintain a fresh supply of water for pets to drink. The re-circulating water can be filtered to remove debris from the water as well as reduces the growth of bacteria and fungus.

A need has arisen for a pet watering device that creates a continuous flow of water to attract pets to drink water as well as to provide a debris and bacteria free source of drinking water for pets.

SUMMARY OF THE INVENTION

In accordance with the present invention, a pet watering device is provided. The watering device includes a bowl having a base with an upwardly extending sidewall attached to the base. A ramp is disposed within the bowl and extends from the bowl sidewall to the base. The ramp includes an aperture for dispensing water. A pump is disposed within the bowl. A water reservoir is disposed between the pump and the ramp for storing water removed by the pump from the bowl. Water stored in the reservoir overflows the reservoir onto the ramp through the ramp aperture for return of water to the bowl.

BRIEF DESCRIPTION OF THE DRAWINGS

For a more complete understanding of the present invention and for further advantages thereof, reference is now made to the following description of the preferred embodiments taken in conjunction with the accompanying drawings in which.

DESCRIPTION OF THE PREFERRED EMBODIMENTS

Figure 1:
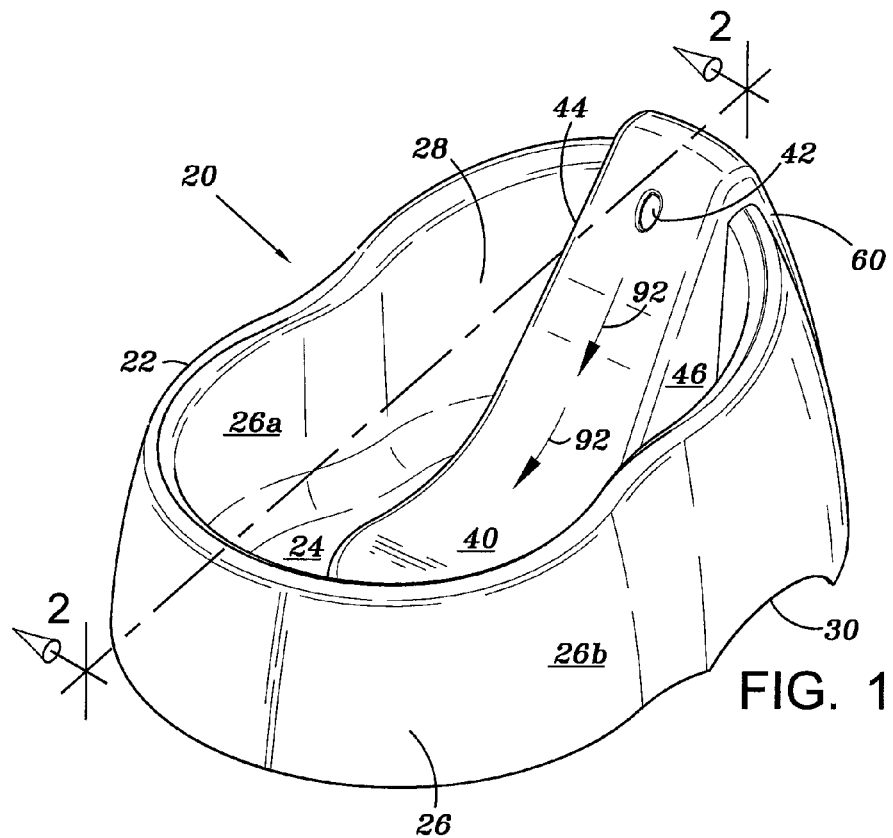
FIG. 1 is a perspective view of a watering device.
Figure 2:
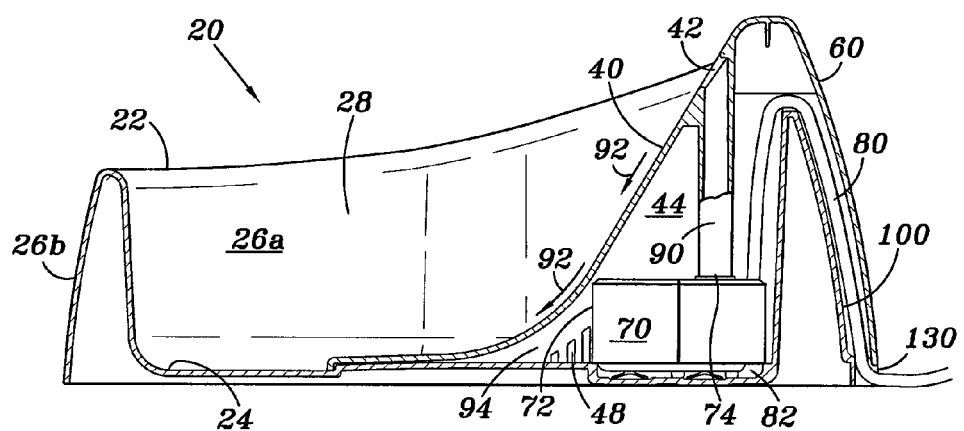
FIG. 2 is a sectional view taken generally along sectional lines 2-2 of FIG. 1.

Referring simultaneously to FIGS. 1 and 2, a pet watering device is illustrated, and is generally identified by the numeral 20. Watering device 20 includes a bowl 22 having a base 24. Extending upwardly from base 24 is a sidewall 26 surrounding base 24 and creating an open top 28 for bowl 22 to allow pets to drink from bowl 22. Sidewall 26 includes an inner surface 26a and an outer surface 26b.

Sidewall 26 includes 30 and 32 (FIG. 4) formed adjacent has base 24 of bowl 22 which allow fingers of a user to be inserted below base 24 for lifting and carrying device 20.

Disposed within bowl 22 of device 20 is a ramp 40. Ramp 40 extends from bowl 22 sidewall inner surface 26a to bowl 22 base 24. Water is dispensed into bowl 22 via ramp 40 through an aperture 42. Ramp 40 includes sidewalls 44 and 46. Ramp sidewalls 44 and 46 include slots 48 and 50, respectively.

Ramp 40 is mounted to outer surface 26b of sidewall 26 utilizing a bracket 60. Bracket 60 is integrally connected to ramp 40, and as illustrated in FIG. 2 extends from the top to the bottom of bowl 22. Ramp 40 is selectively connectable to bowl 22 utilizing bracket 60, such that ramp 40 can be easily removed from bowl 22 for cleaning and refilling of bowl 22.

Figure 3:
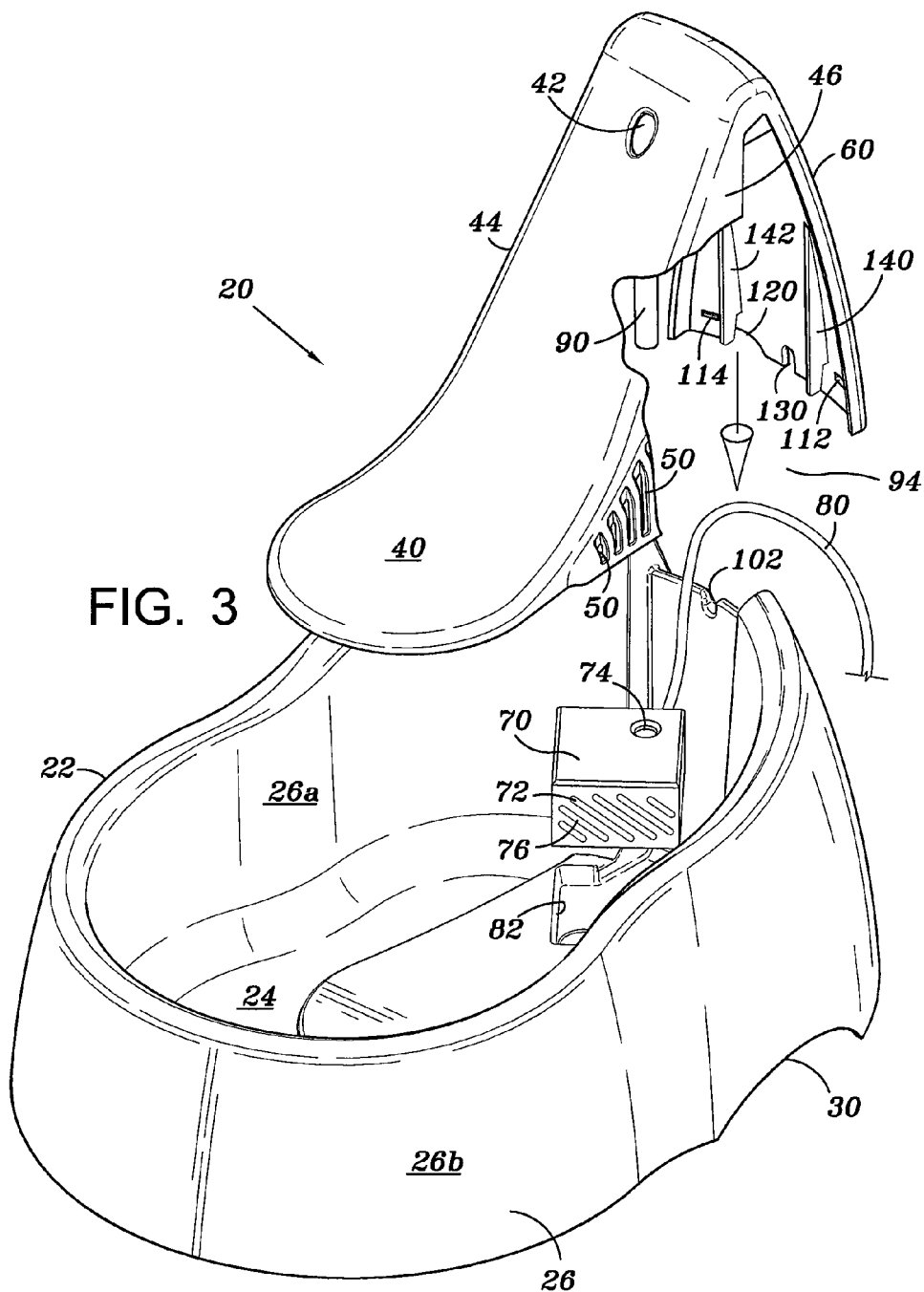
FIG. 3 is a front exploded perspective view of the device shown in FIG. 1.

Referring to FIGS. 2 and 3, pet watering device 20 includes a submersible pump 70. Pump 70 has an intake suction port 72 and a discharge port 74. Unfiltered water is drawn into pump 70 via port 72. Filtered water is dispensed from pump 70 via discharge port 74. suction port 72 includes a filter 76. Pump 70 receives a supply of electrical power via a power cord 80 which is powered from a household AC electricity supply or portable batteries.

Pump 70 is disposed in a recess 82 (FIG. 3) positioned in base 24 of bowl 22.

Referring to FIGS. 2 and 3, integrally interconnected to ramp 40 is a lift tube 90 positioned below aperture 42 of ramp 40. Lift tube 90 is selectively interconnected to port 74 of pump 70. Lift tube 90 operates to transport water from pump 70 to ramp 40 to return filtered and re-circulated water from bowl 22 back into bowl 22 via ramp 40. Water flows down ramp 40 in the direction of arrows 92.

The recirculation of water within bowl 22 through sidewalls 44 and 46 of ramp 40 via slots 48 and 50 into port 72, output from port 74 of pump 70 into lift tube 90 and then discharged through aperture 42 of ramp 40 provides a continuous flow of water to maintain a fresh supply of water for pets to drink as well as to reduce the growth of bacteria and fungus. The stream of water flowing on ramp 40 in the direction of arrows 92 not only attracts pets to watering device 20, but also disturbs the surface tension of water in bowl 22 to inhibit bacteria and fungus growth.

Sidewalls 44 and 46 of ramp 40 together with base 24 and inner surface 26a of sidewall 26 form an enclosure 94 for pump 70. Enclosure 94 prevents a pet from contacting pump 70. Additionally, debris within bowl 22 passing through slots 48 and 50 of sidewalls 44 and 46 of ramp 40 is captured and trapped within enclosure 94 to allow for the accumulation of large particles, such as food, to accumulate under ramp 40 and to be separated from the drinking area of bowl 22.

Figure 4:
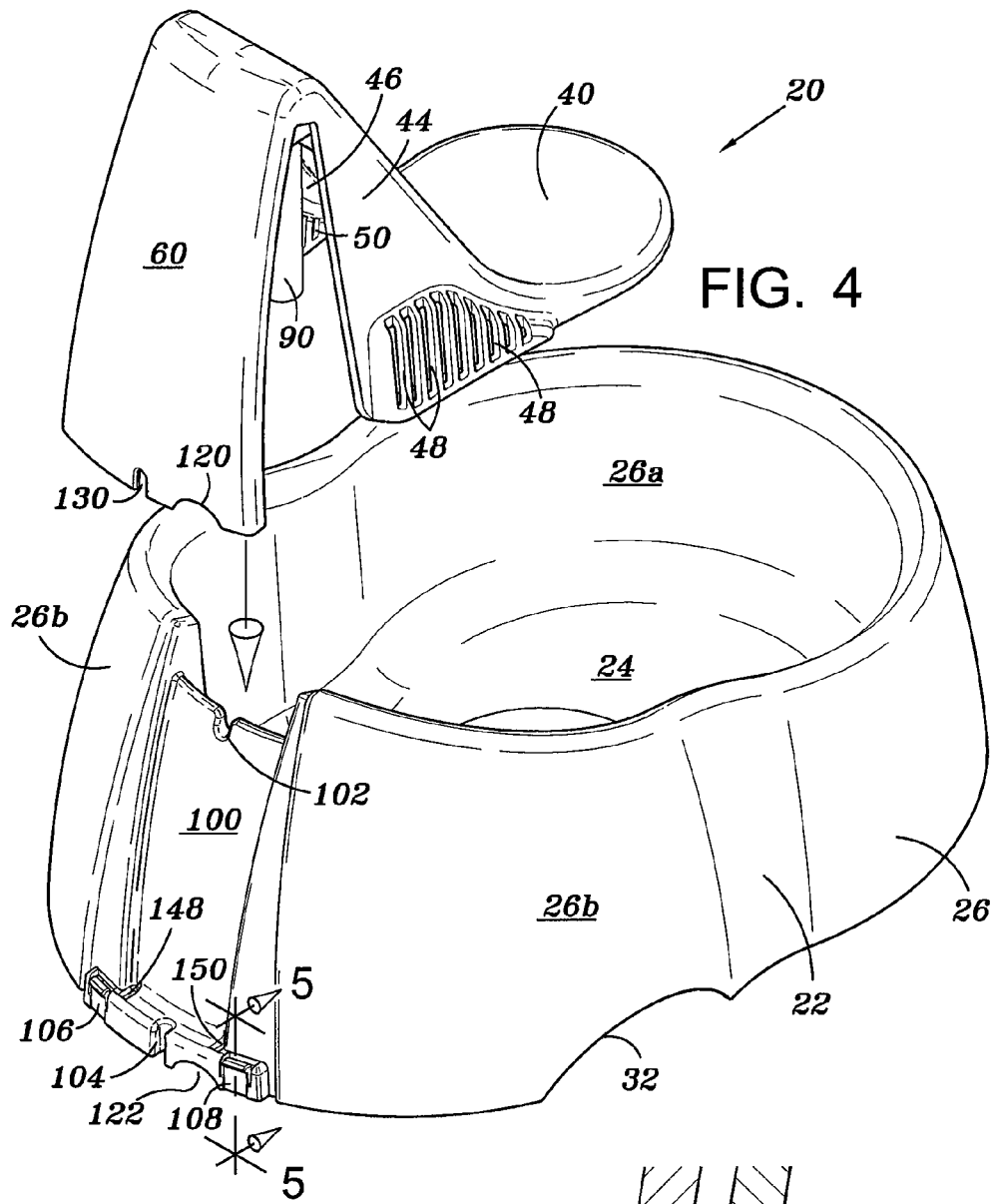
FIG. 4 is a rear exploded perspective view of the device shown in FIG. 1.

Referring now to FIGS. 3 and 4, the mounting of bracket 60 to bowl 22 will now be described. Outer surface 26b of sidewall 26 includes a recess 100. Recess 100 extends from top to bottom of bowl 22. Recess 100 together with bracket 60 forms a housing for power cord 80. Power cord 80 is retained within a slot 102 at the top of recess 100 and slot 104 at the bottom of bowl 22.

Figure 5:
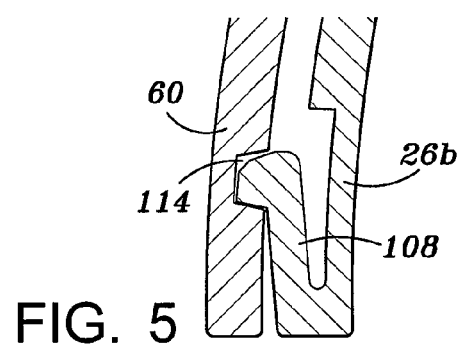
FIG. 5 is a sectional view taken generally along sectional lines 5-5 of FIG. 4.

Outer surface 26b of sidewall 26 includes mounting tabs 106 and 108 which selectively engage recesses 112 and 114, respectively, contained within bracket 60. Tabs 106 and 108 snap into recesses 112 and 114 to mount bracket 60 to bowl 22 (FIG. 5).

Bracket 60 includes a half circle aperture 120 which aligns with a half circle aperture 122 within sidewall 26 which allows access of a user's finger to disengage tabs 106 and 108 from recesses 112 and 114 to permit removal of bracket 60 to thereby remove ramp 40 from bowl 22.

Power cord 80 is received within a slot 130 within bracket 60.

In order to assist in the mounting of bracket 60 to bowl 22, bracket 60 includes ribs 140 and 142 (FIG. 3) whose ends engage apertures 148 and 150, respectively, within sidewall 26, in order to align bracket 60 to recess 100.

Figure 6:
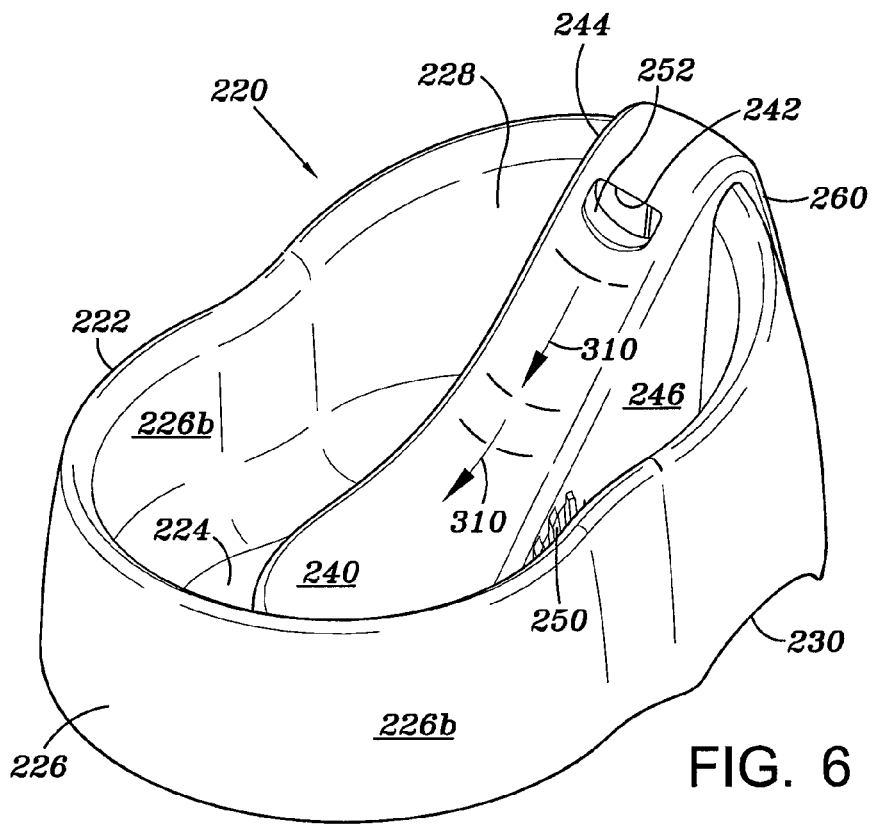
FIG. 6 is a perspective view of the present watering device.
Figure 7:
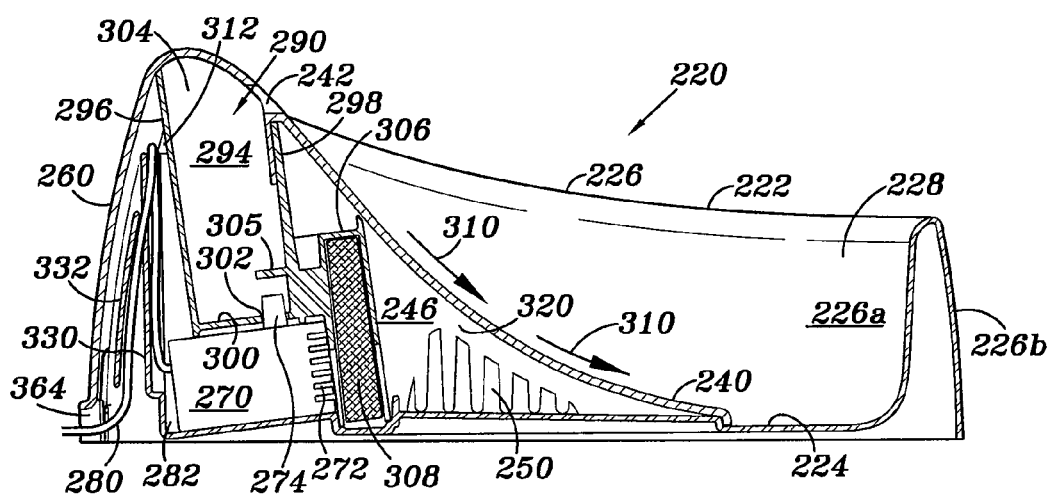
FIG. 7 is a sectional view taken generally along sectional lines 7-7 of FIG. 9.

Referring simultaneously to FIGS. 6 and 7, the present pet watering device is illustrated, and is generally identified by the numeral 220. Watering device 220 includes a bowl 222 having a base 224. Extending upwardly from base 224 is a sidewall 226 surrounding base 224 and creating an open top 228 for bowl 222 to allow pets to drink from bowl 222. Sidewall 226 includes an inner surface 226a and an outer surface 226b.

Sidewall 226 includes handles 230 and 232 (FIG. 8) formed adjacent base 224 of bowl 222 which allow fingers of a user to be inserted below base 224 for lifting and carrying device 220.

Disposed within bowl 222 of device 220 is a ramp 240. Ramp 240 extends from bowl 222 sidewall inner surface 226a to bowl 222 base 224. Water is dispensed into bowl 222 via ramp 240 through an aperture 242. Ramp 240 includes sidewalls 244 and 246. Ramp sidewalls 244 and 246 include slots 248 and 250, respectively.

Aperture 242 includes a ledge 252 for directing, concentrating and flattening the flow of water onto ramp 240. Ledge 252 forms a semi-circular channel with a predetermined radius to direct water onto ramp 240 to control and disperse the flow of water. Ledge 252 establishes a smooth, thick and splash free flow of water on the center of ramp 240. Ramp 240 has a concave curved surface to control the flow of water flowing on ramp 240.

Ramp 240 is removeably mounted to outer surface 226b of sidewall 226 utilizing a bracket 260. Bracket 260 is integrally connected to ramp 240, and as illustrated in FIG. 7 extends from the top to the bottom of bowl 222. Ramp 240 is selectively connectable to bowl 222 utilizing bracket 260, such that ramp 240 can be easily removed from bowl 222 for cleaning and refilling of bowl 222.

Figure 8:
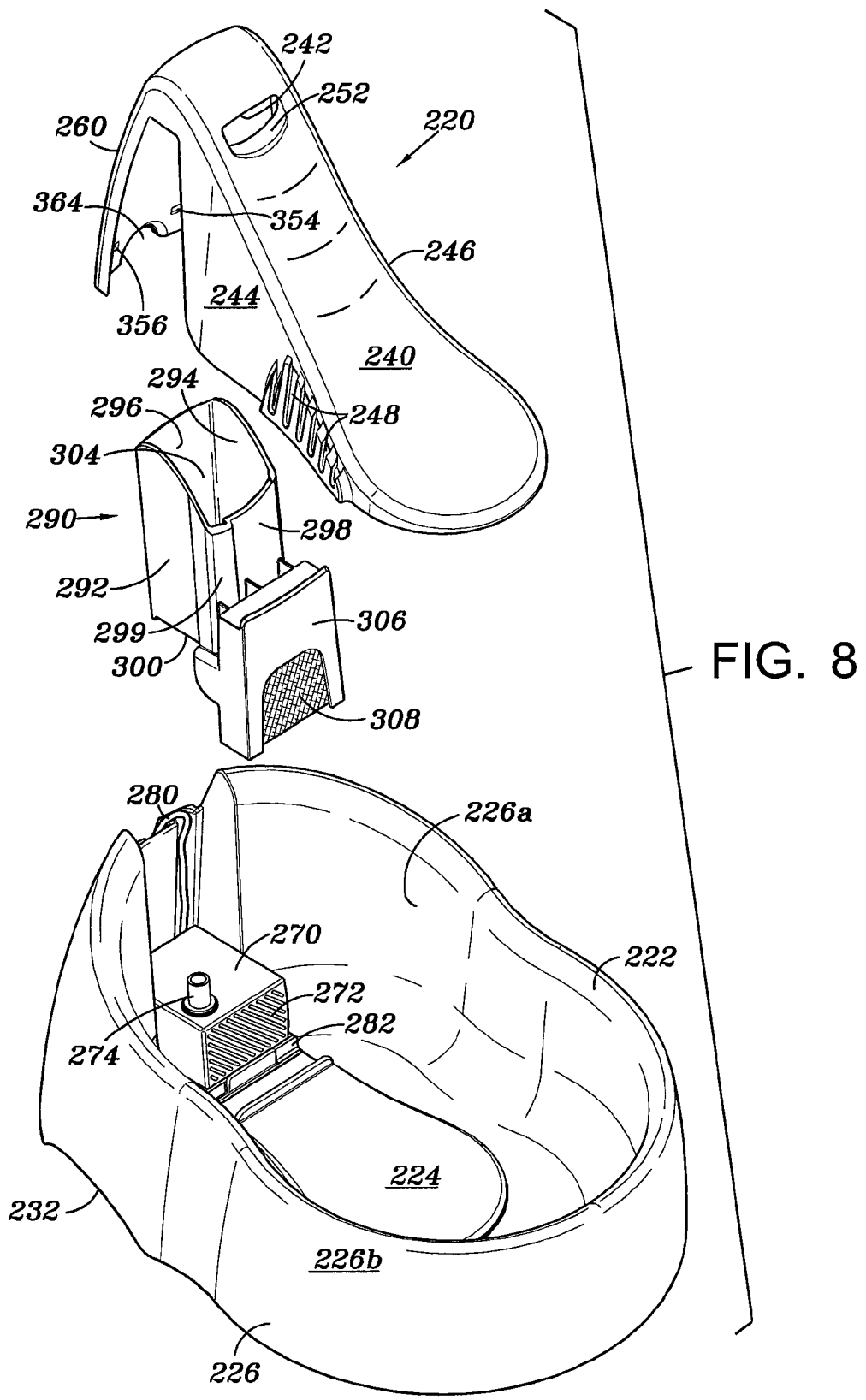
FIG. 8 is a front exploded perspective view of the device shown in FIG. 6.
Figure 9:
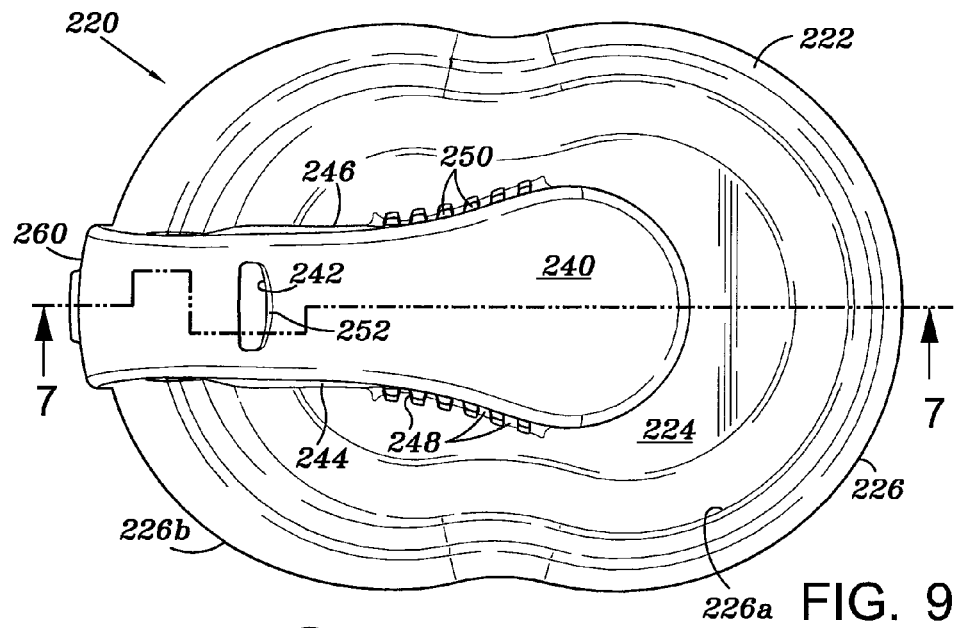
FIG. 9 is a top plan view of the device shown in FIG. 6.

Referring to FIGS. 7 and 8, pet watering device 220 includes a submersible pump 270. Pump 270 has an intake suction port 272 and a discharge port 274. Filtered water is drawn into pump 270 via port 272. Filtered water is dispensed from pump 270 via discharge port 274. Pump 270 receives a supply of electrical power via a power cord 280 which is powered from a household AC electricity supply or portable batteries.

Pump 270 is disposed in a recess 282 (FIG. 7) positioned in base 224 of bowl 222.

Referring to FIGS. 7 and 8, disposed between pump 270 and ramp 240 is a water reservoir 290. Water reservoir 290 includes sidewalls 292 and 294, a rear wall 296 and a front wall 298. Water reservoir 290 further includes a bottom wall 300 including an aperture 302 which mates with discharge port 274 of pump 270. Water reservoir 290 includes an open top 304 which is in fluid communication with aperture 242 of ramp 240.

Water reservoir 290 includes a baffle 305 located above discharge port 274 of pump 270 to disperse the flow of water from pump 270 flowing within reservoir 290 and thereby prevent water spouting upward through aperture 242. Front wall 298 of reservoir 290 includes a channel 299 to direct the flow of water from pump 270 away from aperture 242, and thereby control water flow to aperture 242 to create a gentle wide flow of water through open top 304 of reservoir 290.

Attached to front wall 298 of water reservoir 290 is a bracket 306 for housing a water filter 308. Water filter 308 is disposed adjacent to port 272 of pump 270.

Water reservoir 290 operates to store filtered water received from pump 270 via discharge port 274. The stored water overflows reservoir 290 via opened top 304 and flows onto ramp 240 via aperture 242. Water flows down ramp 242 in the direction of arrows 310. Filtered and recirculated water from bowl 222 is discharged into bowl 222 via ramp 240.

Rear wall 296 of water reservoir 290 includes a clip 312 for mounting reservoir 290 to bowl 222.

The recirculation of water within bowl 222 through sidewalls 244 and 246 of ramp 240 via slots 248 and 250 into filter 308 and port 272, output from port 274 of pump 270 into reservoir 290 and then discharged through aperture 242 of ramp 240 provides a continuous flow of water to maintain a fresh supply of water for pets to drink as well as to reduce the growth of bacteria and fungus. The stream of water flowing on ramp 240 in the direction of arrows 310 not only attracts pets to watering device 220, but also disturbs the surface tension of water in bowl 222 to inhibit bacteria and fungus growth.

Sidewalls 244 and 246 of ramp 240 together with base 224 and inner surface 226a of sidewall 226 form an enclosure 320 for pump 270. Enclosure 320 prevents a pet from contacting pump 270. Additionally, debris within bowl 222 passing through slots 248 and 250 of sidewalls 244 and 246 of ramp 240 is captured and trapped within enclosure 320 to allow for the accumulation of large particles, such as food, to accumulate under ramp 240 and to be separated from the drinking area of bowl 222.

Figure 10:
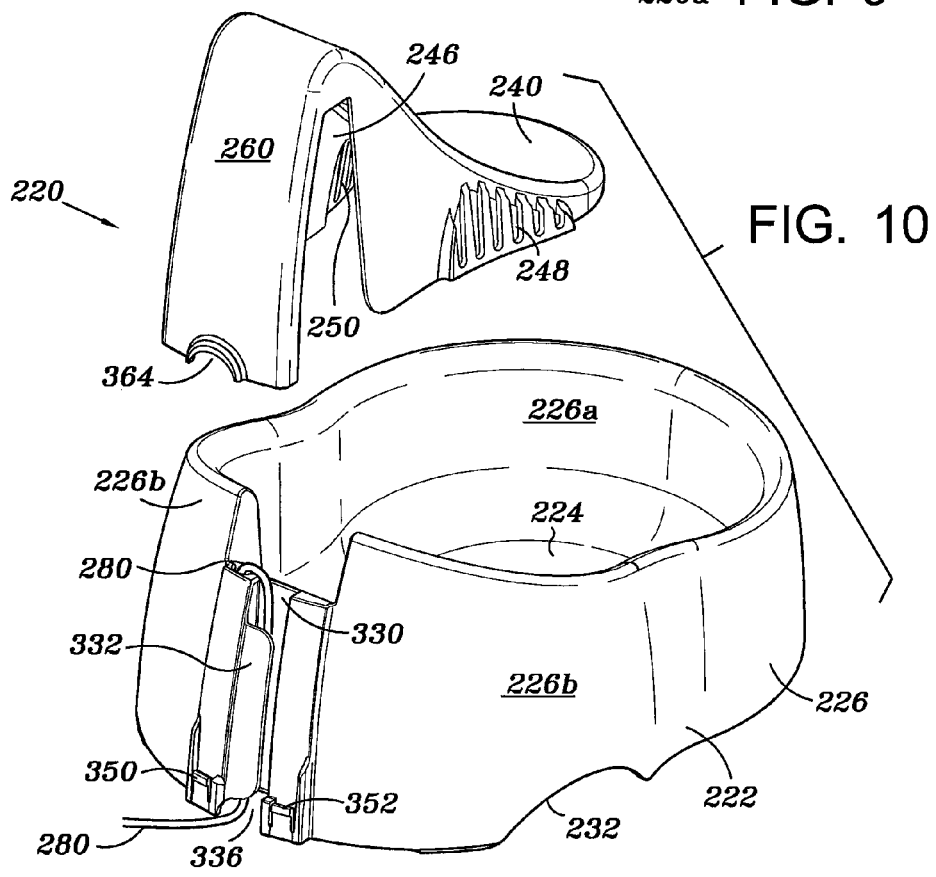
FIG. 10 is a rear exploded perspective view of the device shown in FIG. 6.

Referring now to FIGS. 8 and 10, the mounting of bracket 260 to bowl 222 will now be described. Outer surface 226b of sidewall 226 includes a recess 330. Recess 330 extends from top to bottom of bowl 222. Recess 330 together with bracket 260 forms a housing for power cord 280. Power cord 280 is retained behind a tab 332 extending along recess 330 for retaining cord 280 within recess 330. Power cord 280 exits recess 330 at a notch 336. A notch 364 in bracket 260 allows power cord 280 to exit bowl 222.

Outer surface 226b of sidewall 226 includes mounting tabs 350 and 352 which selectively engage recesses 354 and 356, (FIG. 8) respectively, contained within bracket 260. Tabs 350 and 352 snap into recesses 354 and 356 to mount bracket 260 to bowl 222.

Figure 11:
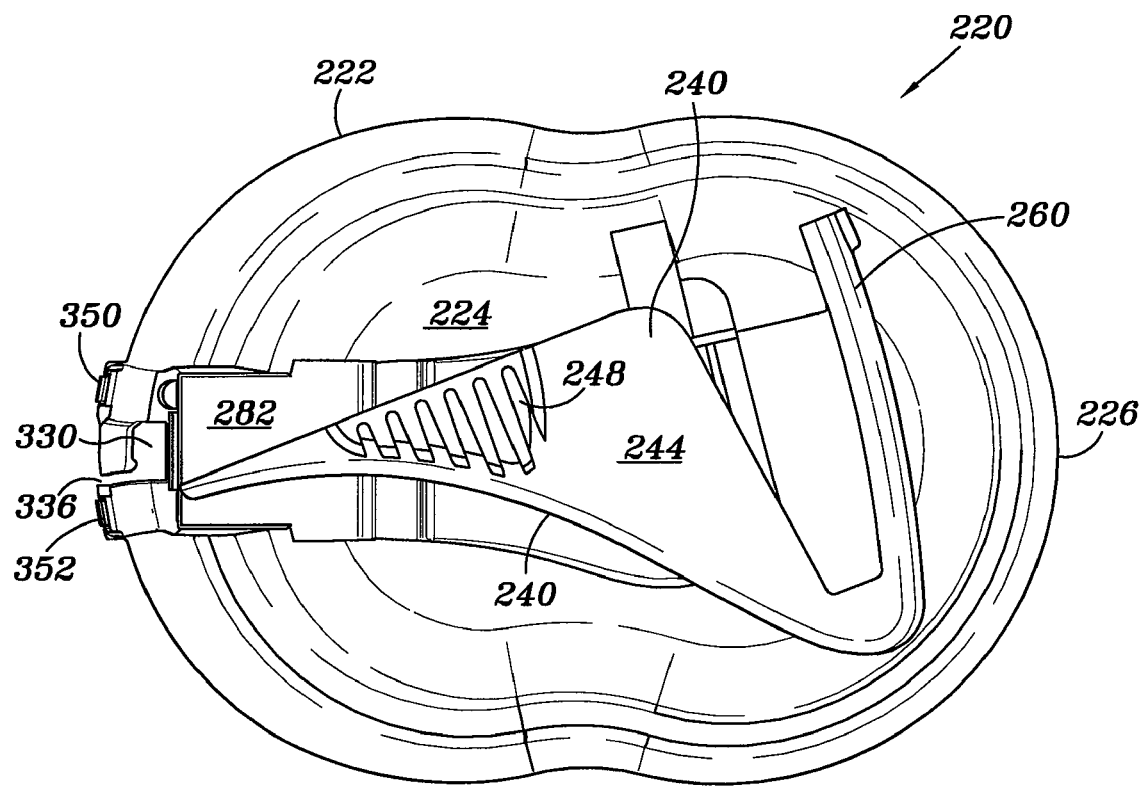
FIG. 11 is a top plan view of the ramp nested within the bowl of the device shown in FIG. 6.
Figure 12:
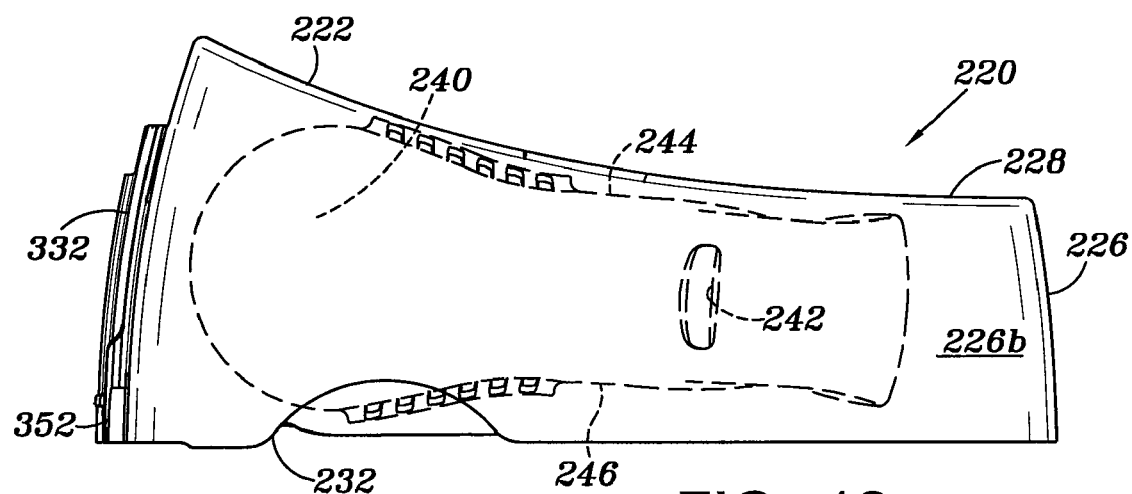
FIG. 12 is a side elevational view of the device shown in FIG. 11.

Referring now to FIGS. 11 and 12, when bracket 260 is disconnected from bowl 222, ramp 240 is removable from bowl 222 and is nestable within bowl 222 for storage and packing. Sidewalls 244 and 246 of ramp 240 are completely contained within bowl 222 and below open top 228 (FIG. 12).

The invention claimed is:
1. A pet watering device, comprising:
    a bowl, said bowl having a base, an upwardly extending sidewall attached to said base and an open top to allow pets to drink from said bowl, said sidewall having an inner surface and an outer surface;

a ramp disposed within said bowl and extending from said bowl sidewall to said bowl base, said ramp having an aperture for dispensing water;

a pump disposed within said bowl, said pump having a suction port and a discharge port; and a water reservoir disposed between said pump discharge port and said ramp aperture for storing water removed by said pump from said bowl, such that water stored in said reservoir overflows said reservoir onto said ramp through said ramp aperture for return of water to said bowl.

2. The device of claim 1 wherein said ramp includes sidewalls extending between said bowl sidewall inner surface and said bowl base to form an enclosure for said pump.

3. The device of claim 2 wherein said reservoir is disposed within said pump enclosure.

4. The device of claim 2 wherein said pump enclosure forms a debris trap for capturing debris from within said bowl.

5. The device of claim 2 and further including a filter disposed adjacent said pump suction port.

6. The device of claim 5 wherein said reservoir includes a bracket for mounting said filter.

7. The device of claim 1 and further including a mounting bracket attached to said ramp for selectively mounting said ramp to said bowl sidewall.

8. The device of claim 7 wherein said pump includes a power cord, and said power cord being disposed between said mounting bracket and said bowl sidewall such that said mounting bracket houses said power cord.

9. The device of claim 7 wherein said mounting bracket extends along said outer surface of said bowl sidewall.

10. The device of claim 9 wherein said pump includes a power cord, and said power cord being disposed between said mounting bracket and said bowl outer surface such that said mounting bracket houses said power cord.

11. The device of claim 1 wherein said reservoir includes a bracket for mounting said reservoir to said bowl.

12. The device of claim 1 and further including a mounting bracket attached to said ramp for selectively mounting said ramp to said bowl sidewall outer surface.

13. The device of claim 12 wherein said mounting bracket includes a recess and said bowl sidewall outer surface includes a mounting tab for selectively engaging said mounting bracket recess for attaching said mounting bracket to said bowl sidewall.

14. The device of claim 13 wherein said ramp includes sidewalls extending between said bowl sidewall inner surface and said bowl base to form an enclosure for said pump.

15. The device of claim 14 wherein said pump enclosure forms a debris trap for capturing debris from within said bowl.

16. The device of claim 15 wherein said ramp sidewalls include apertures through which water flows from said bowl to said pump suction port.

17. The device of claim 16 wherein said pump includes a power cord, said power cord being disposed between said mounting bracket and said bowl sidewall outer surface, such that said mounting bracket houses said power cord.

18. The device of claim 17 and further including a filter disposed within said pump enclosure and adjacent said pump suction port.

19. The device of claim 1 wherein said water reservoir includes a baffle for dispersing water flow from said pump discharge port within said reservoir.

20. The device of claim 1 wherein said water reservoir includes a front wall, a rear wall, sidewalls and a bottom wall, said front wall including an outwardly extending channel for directing water flow from said pump discharge port into said water reservoir and diverted from said ramp aperture.

21. The device of claim 1 wherein said ramp aperture includes a ledge for creating a smooth water flow from said water reservoir onto said ramp.

22. The device of claim 21 where said ledge has a curved surface.

23. The device of claim 1 when said ramp has a concave surface.

24. A pet watering device, comprising:
a bowl, said bowl having a base, an upwardly extending sidewall attached to said base and an open top to allow pets to drink from said bowl;

a removable ramp having sidewalls and selectively disposed within said bowl in a first position extending from said bowl sidewall to said bowl base with said sidewalls generally perpendicular to said bowl base, said ramp having an aperture for dispensing water;

a mounting bracket integrally formed with said ramp for selectively mounting said ramp to said bowl sidewall in said first position;

a pump disposed within said bowl for circulating water through said ramp aperture; and said ramp selectively disposed within said bowl in a second position wherein said ramp sidewalls are generally parallel to said bowl base for storing said ramp within said bowl.

25. The device of claim 24 wherein said ramp sidewalls are located below said bowl open top.

26. The device of claim 24 wherein said mounting bracket comprises at least one engagement recess for engaging said bowl.

27. The device of claim 26 wherein said bowl comprises at least one mounting tab configured to snap into said at least one engagement recess to secure said ramp to said bowl.

28. The device of claim 24 wherein said mounting bracket extends along said outer surface of said bowl sidewall.

29. The device of claim 28 wherein said pump includes a power cord, said power cord being disposed between said mounting bracket and said bowl sidewall outer surface, such that said mounting bracket houses said power cord.

* * * * *